Feb. 13, 1951 M. A. A. WILLS 2,541,974
MEANS FOR ESTABLISHING THE
HARDNESS OF METAL SURFACES
Filed Sept. 12, 1946

Inventor
M. A. A. Wills

Patented Feb. 13, 1951

2,541,974

UNITED STATES PATENT OFFICE 2,541,974

MEANS FOR ESTABLISHING THE HARDNESS OF METAL SURFACES

Mark Aquilla Augustus Wills, Surbiton, England, assignor to Ezekiel F. White, West Hartford, Conn.

Application September 12, 1946, Serial No. 696,545
In Great Britain October 10, 1945

7 Claims. (Cl. 73—78)

This invention relates to means for determining the hardness of metal surfaces and particularly to means, in the form of a portable appliance readily carried in the pocket.

Means for determining the hardness of metal surfaces have hitherto consisted of appliances adapted to produce by pressure or impact an impression of a penetrator in the article being tested, following which it is necessary to measure the impression so made.

Known means employed in portable applances are broadly covered by two categories. In one case a known load is applied to means such as a hardened steel ball or diamond of known form and dimensions for producing an impression and the impression so produced measured and compared with a chart showing such properties as hardness, tensile strength and machinability likely to obtain in the tested article. In the other case an unknown load is applied, by squeezing in a vise or by hammer blow, simultaneously to the article being tested and a reference test piece of known hardness, between which is located a penetrator of known form (usually a hardened steel ball) and the resultant impressions compared by measurement. The difference in diameter of impressions is then compared with either of two charts, dependent upon whether the greater impression is in the test piece or the article tested.

Objections to known means are that they are not self-contained in application, relying on such means as charts for comparison purposes, means for measuring impressions produced, and in some cases means for producing impressions such as a vise or hammer.

Further objections are that known means are of no practical use on very thin material wherein the thickness is in the order of a few thousandths of an inch, and moreover in cases where this objection does not exist it is necessary to provide a substantially flat surface of good surface finish to ensure reasonably accurate results, entailing a preparatory operation on rough or curved surfaces. Such preparatory work may deface a finished article and make the application of known means undesirable or inadmissible.

Furthermore, the application of known means is limited to such cases where space permits and cannot be applied to such surfaces as the flanks of gear teeth, side faces of square section screw threads on the inner walls of hollow cylindrical objects of smaller diameter than that which can accommodate the known forms of apparatus together with means for producing the requisite impressions.

An object of the present invention is to provide a completely self-contained means of assessing the surface hardness of metal or metal faced objects, irrespective of their thickness or surface condition.

A further object is to provide means of assessing the hardness of surfaces not accessible by means of appliances hitherto known.

A further object is to provide improved means of assessing the surface hardness of such articles as curved bearing surfaces where a flat surface does not normally exist and where a test embodying impact would be undesirable and the resultant blemish arising from an impression so made, objectionable or inadmissible.

The present invention comprises a method of testing the hardness of metal surfaces by scratching or abrading which consists in applying each of a pair of testing pieces of known different degrees of hardness and manually traversing them across the surface under any convenient degree of manually applied pressure.

The invention also consists in a method of testing the hardness of metal surfaces by scratching or abrading which consists in simultaneously applying each of a pair of testing pieces of known different degrees of hardness and traversing them across the surface under the same or substantially the same pressure.

The invention is based upon the fact that if a metal surface is capable of being scratched or abraded by any testing piece of known hardness of "A," then that surface is no harder than the testing piece. Conversely if the same metal surface is incapable of being scratched or abraded by any testing piece of known hardness "B" then that surface is harder than the testing piece, and its own surface hardness is known to be between the known values "A" and "B." The smaller the difference between hardness values "A" and "B" the greater is the accuracy of results obtained in practical application.

The invention also consists in means for testing the hardness of metal surfaces by scratching or abrading comprising a set of testing pieces or pins of predetermined difference degrees of hardness.

The invention also consists in a device for testing the hardness of metal surfaces by scratching or abrading comprising a pair of testing pieces or pins of known different degrees of hardness mounted or mountable in holder means so that they may be applied simultaneously to the surface under the same or substantially the same pressure.

Preferably a series, for example, ten testing pieces or pins are arranged in order of their hardness values and mounted in a holder so that any adjacent pair of pins may be applied simultaneously to the surface.

The pins may be arranged around and extend radially from a disc or plate, the pins of highest and lowest hardness being more widely spaced than those having intermediate hardness values.

According to a modification the testing pieces or pins may be provided with eyes and mounted loosely upon a ring having means separating the pieces of highest and lowest hardness value.

Figures 1, 2, 3, 4:
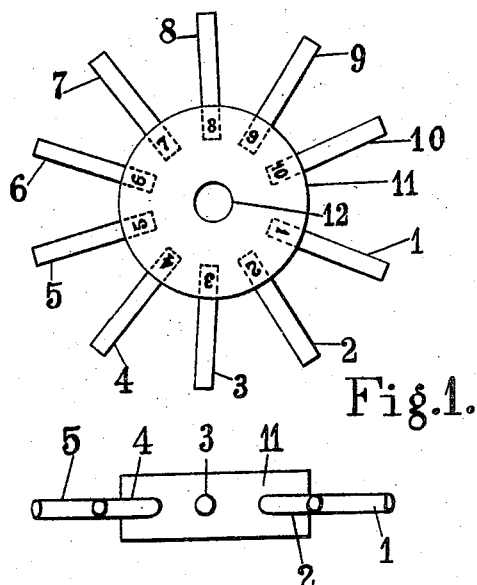
Figure 1 is a plan of a hardness testing device according to the invention.
Figure 2 is an elevation corresponding thereto.
Figure 3 is an elevation of a modification.
Figure 4 is a view of a further modification.

In carrying the invention into effect according to one convenient mode by way of example, a hardness tester of a form readily carried in a garment pocket is constructed from, say, ten testing pieces 1 to 10 of metal or other suitable material, each of known and uniform hardness, but differing in hardness from each other by convenient degrees or fixed degree and each in the form of a cylinder or rod of about one sixteenth of an inch in diameter and about one inch in length.

A holder 11 is provided and consists of a disc or cylindrical piece of metal or other suitable material of, say, three quarters of an inch outer diameter and one quarter of an inch in thickness, a central hole 12 being provided which is screw threaded to a convenient size, say number O. B. A.

In a plane parallel with the circular side faces of the disc 11 and spaced around the outer periphery are radialy disposed holes of slightly smaller diameter than the cylindrical testing pieces or rods 1 to 10 which are forced into the radial holes in adjacent order of their ascending and known hardness values.

These hardness values are then marked on one of the flat surfaces of the holder 11. Corresponding tensile strength values may be marked on the reverse side, such markings being so located as to be readily associated with the various test pieces to which they respectively refer.

It will be seen that there is wider spacing between the testing pieces 1 and 10 forming the extremities of the range provided, to provide easy identification of the high and low limits of the range of hardness.

When the pins 1 to 10 are in position the assembly is then held by the cylindrical holder 11 and revolved about its axis, the ends of the testing pieces being ground or otherwise treated to provide cutting edges.

In use, by way of example on the flank of a gear tooth of which it is required to assess the surface hardness, the improved hardness tester is held by the operator and the two testing pieces 1 and 10 forming the extremities of the range provided are placed in contact with the surface to be tested, and moved in any direction at any angle of contact and with any degree of pressure convenient to the operator.

An examination for scratches may show that no marking has occurred, in which case the hardness lies above the range of the assembly in question, and another assembly embracing a higher range must be used.

Alternatively, both testing pieces 1 and 10 may have produced a mark, in which case the hardness lies below the range of the assembly in question, and another assembly embracing a lower range must be used.

By the foregoing tests, the appropriate assembly is identified, and when, following successive applications, an adjacent pair of testing pieces 1—2, 2—3, 3—4, etc. are applied with the result that only the harder of the two produces a scratch or abrasion, by reference to the values of hardness of such testing pieces, it is established that the surface tested is of a hardness lying between those two known values.

It will be appreciated that the improved hardness tester can be used to check hardness variations occurring over large areas, and by so giving an indication of the locality of hard areas, permit an assessment being made of machineability whereby, and particularly in cases of prismatic metal objects which have to be subjected to varying degrees of metal removal, the most readily machinable areas may be selected and subsequent machining operations planned accordingly.

By similar means, and by application to the ends of steel bars, the identification of special steel having a skin of high carbon content and a refined ductile core, is facilitated.

The improved hardness tester may, if more convenient, be applied to surfaces such as the inner walls of hollow cylindrical objects, by screwing into the threaded hole 12 provided in the holder 11, a rod-like extension piece of convenient length.

Alternatively an extension handle may be provided of such a form that it is substantially radially mounted relative to the improved hardness tester, and by such means, the centre of the cylindrical holder or disc 11 may be provided with a magnifying lens of known form to facilitate the examination of specimens tested.

While it is preferred to arrange the pins to lie in a medial plane as shown they may be inclined to such plane. Further the pins may be turned down at their ends.

According to a modified arrangement, see Figure 3, pairs of testing pins 13, 14 of known hardness may be mounted in a holder or handle 15.

In a modification of such form of the invention a series of testing pins extending over a large range of hardnesses and each bearing the appropriate indication may be removably mountable singly or in pairs in a suitable holder for testing purposes, a screw or screws 16 being provided for locking the pin or pins in position.

In both forms last described the pins may occupy a splayed position in the holder.

According to another modification, see Figure 4, the set of testing pins may be provided with eyes 19 and be mounted loosely on a ring or holder 17 which is provided with a disc or stop 18 located between the pins 20, 21 of the highest and lowest hardness values in the set.

While in the preferred arrangement two pins are applied simultaneously in the testing operation, the pins may be applied singly and the invention thus contemplates the provision of a set of independent testing elements or pins having predetermined different degrees of hardness extending over a scale, such pins being applied singly to the surface to be tested.

I claim:

1. A device for testing the hardness of metal surfaces by scratching or abrading, comprising a holder in the form of a disc, a set of testing pins of metal of predetermined different degrees of hardness rigidly mounted in said disc in spaced relation and extending radially therefrom, said pins being arranged in the order of their hardness values.

2. A device as claimed in claim 1, wherein the pins having the highest and lowest hardness values are spaced more widely than those having intermediate values.

3. A device as claimed in claim 1, wherein the disc is provided with a central tapped hole for mounting the device upon a handle.

4. A device as claimed in claim 1, wherein the pins are of cylindrical shape having an operative end surface located at right angles to the pin axis.

5. A device for testing the hardness of metal surfaces by scratching or abrading, comprising a holder of ring form, a set of testing pins of metal of predetermined different degrees of hardness, said pins having eyes through which the ring extends, said pins being arranged on the ring in the order of their hardness values.

6. A device as claimed in claim 5, wherein said ring is provided with stop means located between the pins having the highest and lowest hardness values.

7. A device for testing the hardness of metal surfaces by scratching or abrading comprising an annular holder, a set of testing pins of predetermined different degrees of hardness, means for mounting the inner ends of the pins on the annular member so that they extend substantially radially therefrom, and said pins being arranged in the order of their hardness values.

MARK AQUILLA AUGUSTUS WILLS.

REFERENCES CITED

The following references are of record in the file of this patent:

UNITED STATES PATENTS

| Number | Name | Date |
|---|---|---|
| 882,363 | Wright | Mar. 17, 1908 |
| 1,524,474 | Burk | Jan. 27, 1925 |
| 1,837,556 | Blond | Dec. 22, 1931 |
| 1,990,430 | Fitzgerald | Feb. 5, 1935 |

FOREIGN PATENTS

| Number | Country | Date |
|---|---|---|
| 564,541 | Germany | Nov. 19, 1932 |

OTHER REFERENCES

Batson and Hyde on Mechanical Testing, published by Chapman & Hall, Ltd., London, vol. 1, page 289. Copy in Div. 36 of U. S. Patent Office.

Circular No. 228, March 1925, of Scientific Section, Educational Bureau of Paint Manufacturers' Ass'n. of the U. S., pages 195 to 199. Copy in Division 36 of this office, Class 73–150.